(12) United States Patent
Wingett et al.

(10) Patent No.: US 8,015,889 B2
(45) Date of Patent: Sep. 13, 2011

(54) BALLSCREW WITH AN INTEGRAL HIGH-EFFICIENCY THRUST BEARING

(75) Inventors: Paul T. Wingett, Mesa, AZ (US); Calvin C. Potter, Mesa, AZ (US); Brent L. Bristol, Phoenix, AZ (US); Casey Hanlon, Queen Creek, AZ (US); Kellan Geck, Chandler, AZ (US); Louie T. Gaines, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 1600 days.

(21) Appl. No.: 11/545,971

(22) Filed: Oct. 10, 2006

(65) Prior Publication Data

US 2010/0275710 A1   Nov. 4, 2010

Related U.S. Application Data

(60) Provisional application No. 60/737,246, filed on Nov. 15, 2005, provisional application No. 60/737,247, filed on Nov. 15, 2005.

(51) Int. Cl.
*F16H 25/22* (2006.01)

(52) U.S. Cl. ........ 74/89.23; 384/507; 384/512; 384/906

(58) Field of Classification Search ................. 74/89.23; 384/507, 511, 512, 906
See application file for complete search history.

(56) References Cited

U.S. PATENT DOCUMENTS

| | | | |
|---|---|---|---|
| 1,504,309 A | 8/1924 | Armstrong et al. | |
| 1,993,809 A | 3/1935 | Schnelle | |
| 2,315,574 A | 4/1943 | Anderson | |
| 2,735,733 A | 2/1956 | Cushman | |
| 3,029,659 A * | 4/1962 | Geyer | 74/409 |
| 3,762,227 A | 10/1973 | Bohnhoff | |
| 3,765,787 A | 10/1973 | Hart et al. | |
| 3,792,619 A | 2/1974 | Cannon et al. | |
| 3,898,890 A | 8/1975 | Simmons et al. | |
| 4,137,784 A * | 2/1979 | Griffin | 74/89.37 |
| 4,425,010 A | 1/1984 | Bryant et al. | |
| 4,493,514 A | 1/1985 | Henry, IV | |
| 4,523,864 A | 6/1985 | Walter et al. | |
| 4,679,451 A * | 7/1987 | Nakamura | 74/606 R |
| 4,715,262 A | 12/1987 | Nelson et al. | |
| 4,739,669 A * | 4/1988 | Yokose et al. | 74/89.36 |
| 4,773,497 A | 9/1988 | Carlson et al. | |
| 4,889,002 A * | 12/1989 | Abraham | 74/89.38 |
| 4,938,090 A | 7/1990 | Brussaco | |
| 5,086,851 A | 2/1992 | Beasley | |

(Continued)

FOREIGN PATENT DOCUMENTS

JP   3-37414   * 2/1991

*Primary Examiner* — William C Joyce
(74) *Attorney, Agent, or Firm* — Ingrassia Fisher & Lorenz, P.C.

(57) ABSTRACT

A linear actuator includes a thrust bearing that is integral to the actuation member. The actuator includes a translation member and an actuation member. The actuation member is responsive to a drive force to rotate. The translation member is configured to translate in response to actuation member. The thrust bearing is coupled to the actuation member and includes an inner race, an outer race, and a plurality of balls. The thrust bearing is configured as a zero lead ballscrew, with the inner race integrally formed on the actuation member, and the plurality of balls disposed between the inner and outer races.

16 Claims, 4 Drawing Sheets

U.S. PATENT DOCUMENTS

| | | | |
|---|---|---|---|
| 5,144,851 A | 9/1992 | Grimm et al. | |
| 5,193,408 A * | 3/1993 | Fukui et al. | 74/89.35 |
| 5,248,204 A | 9/1993 | Livingston et al. | |
| 5,282,391 A * | 2/1994 | Rantanen | 74/89.23 |
| 5,388,471 A | 2/1995 | DeCampos et al. | |
| 5,421,712 A | 6/1995 | Laing et al. | |
| 5,540,113 A | 7/1996 | Takei | |
| 5,566,644 A | 10/1996 | Beery | |
| 5,899,648 A | 5/1999 | Kanaan et al. | |
| 6,067,868 A * | 5/2000 | Nakamura et al. | 74/89.35 |
| 6,164,707 A * | 12/2000 | Ungchusri et al. | 285/276 |
| 6,168,316 B1 * | 1/2001 | Paling et al. | 384/490 |
| 6,202,306 B1 * | 3/2001 | Miyazaki | 29/898.09 |
| 6,240,797 B1 * | 6/2001 | Morishima et al. | 74/89.39 |
| 6,389,915 B1 | 5/2002 | Wingett | |
| 6,394,657 B1 * | 5/2002 | Takamizawa et al. | 384/512 |
| 6,742,933 B2 * | 6/2004 | Murata | 384/512 |
| 2004/0173428 A1 | 9/2004 | Bowen | |
| 2005/0178227 A1 | 8/2005 | Minakuchi | |
| 2005/0257633 A1 * | 11/2005 | Yamagishi | 74/89.33 |
| 2006/0213298 A1 * | 9/2006 | Tateishi | 74/89.23 |

* cited by examiner

BALLSCREW WITH AN INTEGRAL HIGH-EFFICIENCY THRUST BEARING

CROSS-REFERENCE TO RELATED APPLICATIONS

This application claims the benefit of U.S. Provisional Application No. 60/737,246, filed Nov. 15, 2005, and U.S. Provisional Application No. 60/737,247, also filed Nov. 15, 2005.

TECHNICAL FIELD

The present invention relates to ballscrew-type actuators and, more particularly, to a ballscrew for ballscrew-type actuators that includes an integral high efficiency thrust bearing.

BACKGROUND

Actuators are used in myriad devices and systems. For example, many vehicles including, for example, aircraft, spacecraft, watercraft, and numerous other terrestrial and non-terrestrial vehicles, include one or more actuators to effect the movement of various control surfaces or components. In many applications such as, for example, aircraft flight surface control systems and missile thrust vector control systems, the actuators that are used may be subject to relatively severe environmental conditions, as well as relatively high magnitude shock and vibration, and are designed to handle relatively high loads.

In order to handle the relatively high loads, many actuators include thrust bearings to transfer the axial force supplied to one or more of the actuation elements, such as a ballscrew, to one or more other components, such as the actuator housing assembly. Although the designs of the thrust bearings that are currently used are generally safe, reliable, and robust, these current thrust bearings do suffer certain drawbacks. For example, many thrust bearings exhibit low efficiency and are relatively heavy. These factors can reduce the overall efficiency of the actuators in which the thrust bearings are installed and/or can increase the overall weight of the actuators, which can lead to increased costs.

Hence, there is a need for an actuator that includes a thrust bearing that exhibits greater efficiency and/or is relatively lighter in weight than currently used thrust bearings. The present invention addresses one or more of these needs.

BRIEF SUMMARY

The present invention provides a linear actuator, and more specifically, a linear ballscrew-type actuator that includes a thrust bearing that is integral to the ballscrew.

In one embodiment, and by way of example only, an actuator assembly includes a motor, an actuation member, a translation member, and a thrust bearing. The motor is adapted to receive electrical drive power and is configured, upon receipt thereof, to supply a drive force. The actuation member is coupled to receive the drive force from the motor and is configured, upon receipt thereof, to rotate. The actuation member additionally includes at least an outer surface. The translation member is disposed adjacent the actuation member and is configured, upon rotation of the actuation member, to translate to a position. The thrust bearing is coupled to the actuation member and includes an inner race, an outer race, and a plurality of balls. The inner race is integrally formed on the actuation member outer surface, and has an outer surface including a plurality of annular grooves formed therein. The outer race has at least an inner surface, and is spaced apart from, and surrounds at least a portion of, the inner race outer surface. The outer race inner surface has a plurality of annular grooves formed therein that are collocated with two or more of the annular grooves formed in the inner race outer surface. The plurality of balls are disposed between the inner and outer races, and each ball is disposed within a pair of the collocated annular grooves.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
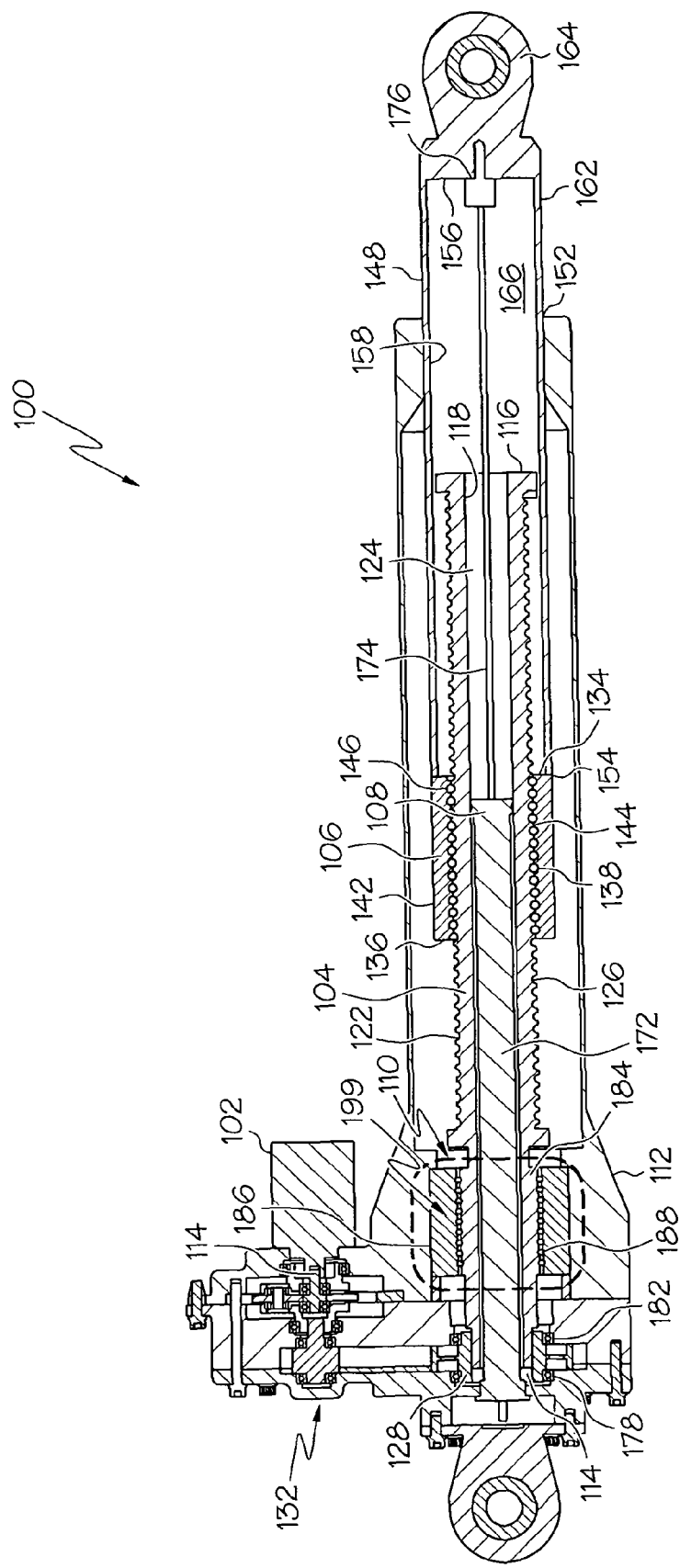
FIG. 1 is a cross section view of an exemplary ballscrew actuator that includes an exemplary embodiment of an integral ball screw thrust bearing according to an embodiment of the present invention.

Referring to FIG. 1, a cross section view of an exemplary actuator 100 is depicted. The depicted actuator 100 is a linear electromechanical (EMA) actuator and includes a motor 102, an actuation member 104, a translation member 106, a position sensor 108, and an integral thrust bearing 110, all disposed at least partially within or on a single actuator housing assembly 112. The actuator housing assembly 112 completely encloses each of the just-mentioned components, with the exception of the motor 102. The motor 102 is instead separately mounted to the actuator housing assembly 112. The actuator housing assembly 112 and motor 102 are configured such that, upon being coupled to one another, the motor output shaft 114 extends into the actuator housing assembly 112. The actuator housing assembly 112 additionally includes one or more non-illustrated electrical connectors, which include, for example, a motor connector and a sensor connector that are adapted to receive one or more non-illustrated cables. The motor connector is used to electrically interconnect a controller and the motor 102, and the sensor connector is used to electrically interconnect the controller and the position sensor 108. Alternatively, one or more wire harnesses or pigtails could be used instead of the associated connectors.

Turning now to a description of the components mounted within or on the actuator housing assembly 112, it will be appreciated that the motor 102 is preferably a brushless DC motor; however, this is merely exemplary and it could be any one of numerous types of AC or DC motors. The motor 102 receives actuator position command signals from a controller and, in response to the actuator position command signals, rotates in the commanded direction to supply a rotational drive force to the actuation member 104. As will be described in more detail further below, in the depicted embodiment the rotational drive force is supplied to the actuation member 104 via one or more gears.

The actuation member 104 is preferably implemented as a ballscrew, and is rotationally mounted within the actuator housing assembly 112. The actuation member 104 includes a first end 114, a second end 116, an inner surface 118, and an outer surface 122. The ballscrew inner surface 118 defines a substantially cylindrical sensor passageway 124 that extends at least partially through the ballscrew 104. The ballscrew outer surface 122 has a single or a plurality of ball grooves (or "threads") 126 formed thereon and has an input gear 128 coupled thereto proximate the ballscrew first end 114. The input gear 128 receives the rotational drive force from the motor 102, via a gear assembly 132, which in turn causes the ballscrew 104 to rotate.

The translation member 106 is preferably implemented as a ballnut, and is disposed at least partially around the ballscrew 104. The ballnut 106, similar to the ballscrew 104, includes a first end 134, a second end 136, an inner surface 138, and an outer surface 142. The ballnut 106 is mounted against rotation within the actuator housing assembly 112 and is configured, in response to rotation of the ballscrew 104, to translate axially within the actuator housing assembly 112. The ballnut 106, similar to the ballscrew 104, has a plurality of helical ball grooves (or "threads") 144 formed therein. A plurality of recirculating balls 146 are disposed within the ballnut ball grooves 144, and in selected ones of the ballscrew ball grooves 126. The balls 146, in combination with the ball grooves 126, 144, convert the rotational movement of the ballscrew 104 into the translational movement of the ballnut 106. It will be appreciated that the direction in which the ballnut 106 travels will depend on the direction in which the ballscrew 104 rotates.

The ballnut 106 includes an extension tube 148 that extends through an opening 152 in the actuator housing assembly 112. The extension tube 148 includes a first end 154, a second end 156, an inner surface 158, and an outer surface 162. The extension tube first end 154 is disposed within the actuator housing assembly 112, whereas the extension tube second end 156 is disposed external thereto and has a rod end assembly 164 coupled thereto. The rod end assembly 164 is configured to couple the extension tube 148 to a component (not shown), such as an aircraft or missile flight surface or a missile thrust vectoring nozzle, so that the actuator 102 can move the component to the position commanded by the controller. The extension tube inner surface 158 forms a cavity 166, and the extension tube outer surface 162 is mounted against rotation within the actuator housing assembly 112. This may be implemented using any one of numerous types of anti-rotation mounting configurations. For example, the extension tube outer surface 162 could have a groove or slot formed therein in which a section of the actuator housing assembly 112 is inserted.

As was mentioned above, the rotational drive force of the motor 102 is supplied to the ballscrew 104 via a gear assembly 132. It will be appreciated that the gear assembly 132 may be implemented using any one of numerous gear arrangements, now known or developed in the future, that may be configured with a step-down gear ratio so that a desired rotational speed reduction of the motor output shaft 114 rotational speed occurs. It will additionally be appreciated that the rotational speed reduction provided by the gear assembly 132 may vary to achieve a desired force output for the actuator 102. No matter its specific implementation, the gear assembly 132 receives the rotational drive force supplied by the motor 102 and, in response, supplies the rotational drive force to the ballscrew input gear 128. In response, the ballscrew 104 rotates, which in turn causes the ballnut 106 to translate.

The position sensor 108 is disposed at least partially within the ballscrew 104 and is additionally coupled to extension tube 148. More specifically, in the depicted embodiment the position sensor 108 is implemented as a linear variable differential transformer (LVDT) that includes a differential transformer (not shown) disposed within a sensor housing 172, and a movable slug 174. The sensor housing 172 is coupled to the actuator housing assembly 112 and extends into the sensor passageway 124 formed in the ballscrew 104. The movable slug 174 is coupled to the extension tube 148, via a slug mount 176 that is formed on the extension tube inner surface 158, and is movably disposed within, and extends from, the sensor housing 174.

The differential transformer, as is generally known, includes at least a non-illustrated primary winding, and a non-illustrated differentially wound secondary winding. The transformer primary winding is energized with an AC signal supplied from, for example, the controller via the sensor connector, and the secondary winding supplies a position signal representative of the position of the movable slug 174 to, for example, the controller via the sensor connector. Because the movable slug 174 is coupled to the extension tube 148, the movable slug 174 translates whenever the ballnut 106 translates. Thus, the position signal supplied from the secondary winding is representative of the position of the ballnut 106, which may in turn be correlated to the position of the element to which the actuator 100 is coupled.

It will be appreciated that an LVDT is merely exemplary of a particular preferred position sensor 108, and that the position sensor 108 may be implemented using any one of numerous other sensing devices now known, or developed in the future. Examples of alternative position sensors include, but are not limited to, a rotary variable differential transformer (RVDT), a potentiometer, a resolver, one or more Hall sensors, and one or more optic sensors.

A plurality of bearing assemblies, which includes a pair of ball bearing assemblies 178, 182, and the integral thrust bearing 110, are mounted within the actuator housing assembly 112. The ball bearing assemblies 178, 182 rotationally support the ballscrew 104 and input gear 128 in the actuator housing assembly 112. The integral thrust bearing 110 is relatively compact and transfers any axial force supplied to the ballscrew 104, in either axial direction, to the actuator housing assembly 112 with relatively high efficiency. With reference now to FIGS. 2-6, in combination with FIG. 1, a particular preferred embodiment of the integral thrust bearing 110 will be described.

The integral thrust bearing 110 is implemented as a zero lead ball screw, and includes an inner race 184, an outer race 186, and a plurality of balls 188. The inner race 184 is integrally formed on the ballscrew outer surface 122, and includes an outer surface 192 having a plurality of annular grooves 194 formed therein. Although the number of annular grooves 194 may vary, in the depicted embodiment nine annular grooves 194 are formed in the inner race outer surface 192.

The outer race 186 is mounted against rotation within the actuator housing assembly 112, and surrounds the inner race 192. The outer race 186 includes an inner surface 196 and an outer surface 198, and has a plurality of annular grooves 202 formed in the inner surface 196. Each of the annular grooves 202 that is formed in the outer race inner surface 196 is collocated with one of the annular grooves 194 formed on the inner race outer surface 192. Thus, as with the annular grooves 194 that are formed in the inner race outer surface 192, the outer race inner surface 196 has nine annular grooves 202 formed therein.

Figure 2:
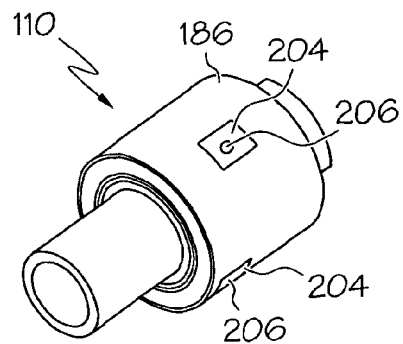
FIG. 2 is a perspective view of an exemplary integral ball screw thrust bearing, and depicting only a portion of the ball screw mechanism, that may be incorporated into the exemplary ball screw actuator of FIG. 1.
Figure 3:
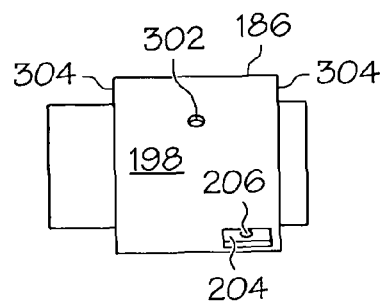
FIG. 3 is a side view of the integral ball screw thrust bearing depicted in FIG. 2.
Figure 4:
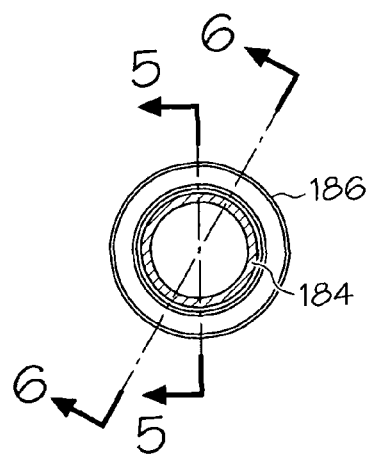
FIG. 4 is an end view of the integral ball screw thrust bearing depicted in FIG. 2.
Figure 5:
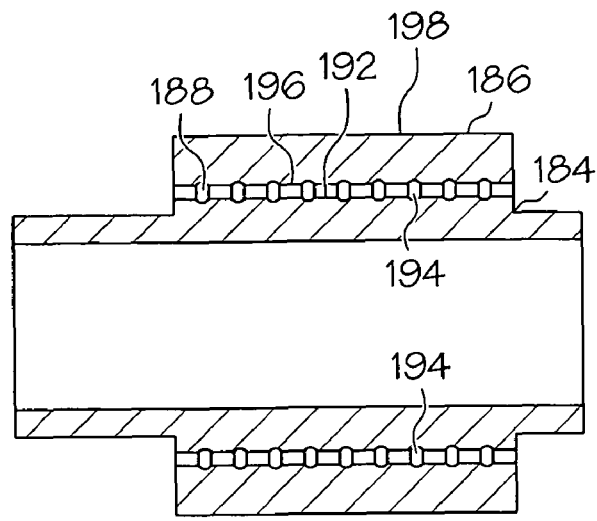
FIGS. 5 and 6 are cross section views of the integral ball screw thrust bearing depicted in FIG. 2, taken along lines 5-5 and 6-6, respectively, in FIG. 4.
Figure 6:
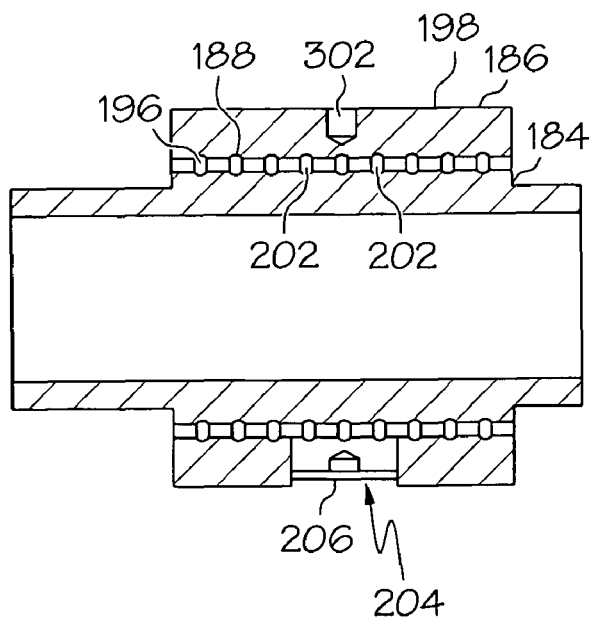

The plurality of balls 188 are disposed between the inner and outer races 184, 188, and within the annular grooves 194, 202 that are formed in the outer and inner surfaces 192, 196 thereof, respectively. The balls 188 are inserted between the inner and outer races 184, 186 and into each of the grooves 194, 202 via a ball insertion opening 204. The ball insertion openings 204 are used to insert each of the plurality of balls 188 and extend through the outer race 186 between the outer race outer and inner surfaces 196, 198. As shown in FIGS. 2, 3, and 6, three ball insertion openings 204 are preferably formed in the outer race 186. It will be appreciated, however, that this is merely exemplary, and that more or less than this number could be included. Moreover, as FIGS. 2, 3, and 6 also depict, after the balls 188 have been inserted between the inner and outer races 184, 186, a cover 206 is disposed within each of the ball insertion openings 204.

As was noted above, the outer race 186 is mounted against rotation within the actuator housing assembly 112. In one particular configuration, which is depicted most clearly in FIGS. 3 and 6, the integral thrust bearing 110 includes an anti-rotation opening 302 that extends from the outer race outer surface 198 partially into the outer race 186. As FIG. 1 further depicts, with this configuration a pin 199 or other suitable device is coupled to the actuator assembly housing 112 and inserted into the anti-rotation opening 302. It will be appreciated that this particular configuration is merely exemplary, and that the outer race 186 could be configured to be mounted against rotation using according to any one of numerous other configurations and/or using any one of numerous devices. For example, the anti-rotation opening 302 could be formed in one or both ends 304 (see FIG. 3) of the outer race 186, or a non-illustrated flange or non-illustrated pin could extend from the outer race 186 into a non-illustrated opening formed in the actuator housing assembly 112.

Figure 7:
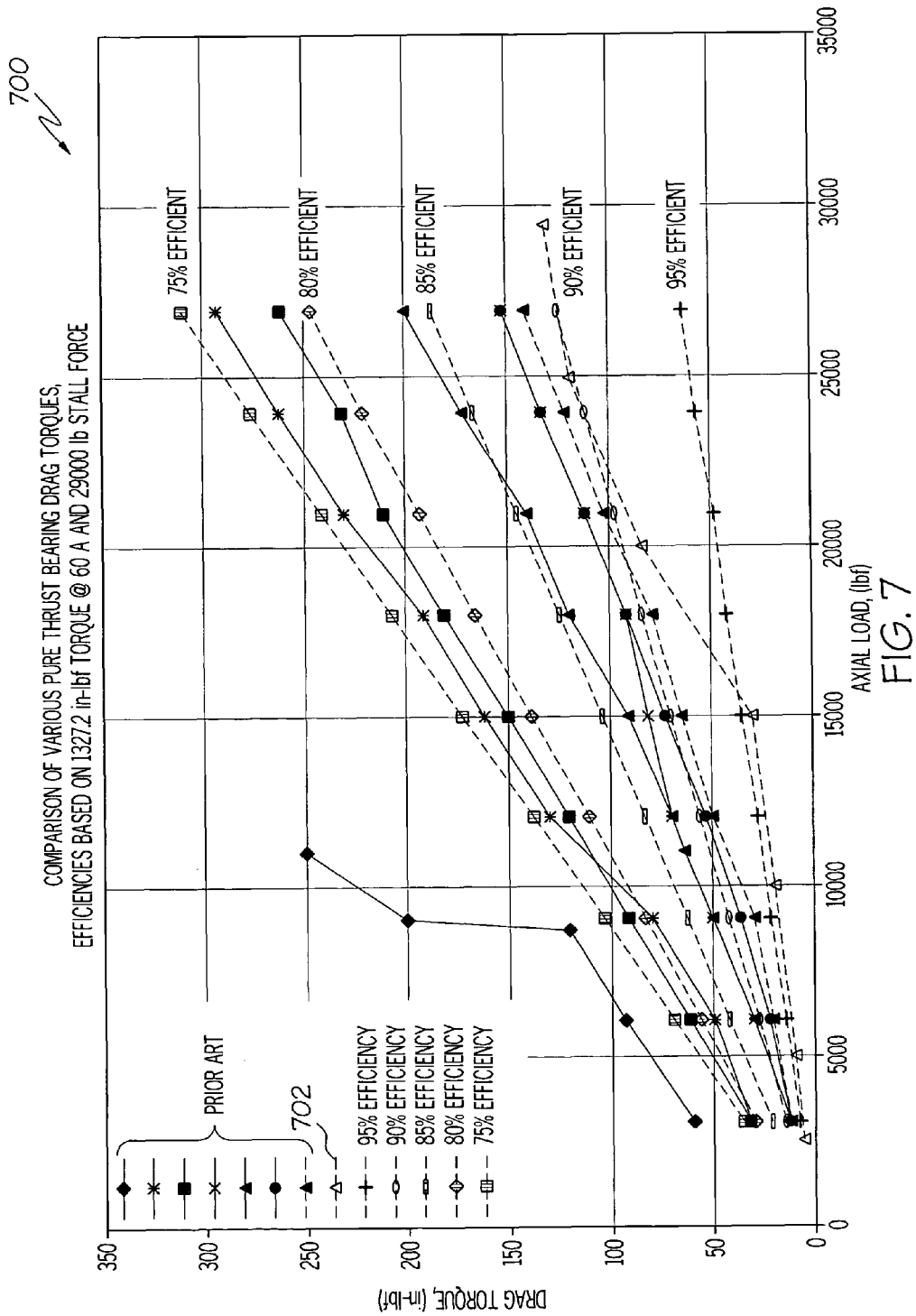
FIG. 7 is a graph of drag torque versus axial load, which compares the performance of various types of thrust bearings, including the integral ball screw thrust bearing of FIGS. 2-6.

The integral thrust bearing 184 depicted in FIGS. 1-6 and described above exhibits greater efficiency than various other types of thrust bearing assemblies that are currently known. Evidence of this greater efficiency may be seen from the graph 700 depicted in FIG. 7, which shows drag torque versus axial load for various thrust bearing assemblies, including the one depicted and described herein, which is referenced using numeral 702 in FIG. 7.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An actuator assembly, comprising:
    a motor adapted to receive electrical drive power and configured, upon receipt thereof, to supply a drive force;
    an actuation member coupled to receive the drive force from the motor and configured, upon receipt thereof, to rotate, the actuation member including at least an outer surface;
    a translation member disposed adjacent the actuation member and configured, upon rotation of the actuation member, to translate to a position; and
    a thrust bearing coupled to the actuation member, the thrust bearing including:
        an inner race integrally formed on the actuation member outer surface, the inner race having an outer surface including a plurality of annular grooves formed therein,
        an outer race having at least an inner surface and an outer surface, the outer race inner surface spaced apart from, and surrounding at least a portion of, the inner race outer surface, the outer race inner surface having a plurality of annular grooves formed therein that are collocated with two or more of the annular grooves formed in the inner race outer surface, the outer race outer surface including an anti-rotation opening,
        a plurality of balls disposed between the inner and outer races, each ball disposed within a pair of the collocated annular grooves,
        a plurality of ball insertion openings that extend between the outer race inner surface and the outer race outer surface,
        a plurality of covers, each cover disposed within one of the plurality of ball insertion openings, and
        a pin adapted to be fixedly coupled to a housing and disposed within the anti-rotation opening.

2. The actuator assembly of claim 1, wherein:
    the actuation member comprises a ballscrew; and
    the translation member comprises a ballnut mounted against rotation on the ballscrew and configured, upon rotation of the ballscrew, to translate to the position.

3. The actuator assembly of claim 2, wherein:
    the ballscrew includes an outer surface having a plurality of ball grooves formed thereon;
    the ballnut includes an inner surface having a plurality of ball grooves formed thereon; and
    the actuator assembly further comprises a plurality of recirculating balls disposed within the ballnut helical ball grooves and selected ones of the ballscrew helical ball grooves.

4. The actuator assembly of claim 3, wherein the ballscrew includes an inner surface that defines a sensor cavity, and wherein the actuator assembly further comprises:
    a position sensor disposed at least partially within the ballscrew cavity, the position sensor configured to sense the position of the ballnut and supply a position signal representative thereof.

5. The actuator assembly of claim 1, wherein:
    the actuation member further includes a first end and a second end;
    the actuator assembly further comprises an actuator assembly housing; and
    the thrust bearing outer race is coupled between the actuator assembly housing and the actuation member first end.

6. The actuator assembly of claim 1, wherein the translation member further includes a first end and a second end, and wherein the actuator assembly further comprises:

a rod end assembly coupled to the translation member second end, the rod end assembly configured to couple the translation member to an aerospace component.

7. The actuator assembly of claim 6, further comprising:
an extension tube coupled between the rod end assembly and the translation member second end.

8. The actuator assembly of claim 1, further comprising:
an actuator housing assembly,
wherein the motor is mounted on the actuator assembly housing.

9. The actuator assembly of claim 1, further comprising:
a plurality of gears coupled between the motor and the actuation member, the gears configured to receive the rotational drive force supplied by the motor and transfer the rotational drive force to the actuation member.

10. An actuator assembly, comprising:
a housing;
a motor mounted on the housing and configured to supply a rotational drive force;
a ballscrew rotationally mounted within the housing and including at least an inner surface and an outer surface, the ballscrew inner surface defining a sensor cavity, the ballscrew outer surface having a plurality of ball grooves formed thereon, the ballscrew adapted to receive the rotational drive force from the motor and configured, in response thereto, to rotate;
a ballnut disposed at least partially within housing and mounted against rotation, the ballnut disposed at least partially around the ballscrew and including at least an inner surface and an outer surface, the ballnut inner surface having a plurality of ball grooves formed thereon;
a plurality of balls disposed within the ballnut ball grooves and at least selected ones of the ballscrew ball grooves, whereby rotation of the ballscrew causes translation of the ballnut to a position; and
a thrust bearing coupled to the ballscrew, the thrust bearing including:
an inner race integrally formed on a portion of the ballscrew outer surface, the inner race having an outer surface including a plurality of annular grooves formed therein,
an outer race having at least an inner surface and an outer surface, the outer race inner surface spaced apart from, and surrounding at least a portion of, the inner race outer surface, the outer race inner surface having a plurality of annular grooves formed therein that are collocated with two or more of the annular grooves formed in the inner race outer surface, the outer race outer surface including an anti-rotation opening,
a plurality of balls disposed between the inner and outer races, each ball disposed within a pair of the collocated annular grooves,
a plurality of ball insertion openings that extend between the outer race inner surface and the outer race outer surface,
a plurality of covers, each cover disposed within one of the plurality of ball insertion openings, and
a pin fixedly coupled to the housing and disposed within the anti-rotation opening.

11. The actuator assembly of claim 10, wherein:
the ballscrew includes an outer surface having a plurality of ball grooves formed thereon;
the ballnut includes an inner surface having a plurality of ball grooves formed thereon; and
the actuator assembly further comprises a plurality of recirculating balls disposed within the ballnut helical ball grooves and selected ones of the ballscrew helical ball grooves.

12. The actuator assembly of claim 11, wherein the ballscrew includes an inner surface that defines a sensor cavity, and wherein the actuator assembly further comprises:
a position sensor disposed at least partially within the ballscrew cavity, the position sensor configured to sense the position of the ballnut and supply a position signal representative thereof.

13. The actuator assembly of claim 10, wherein:
the ballscrew further includes a first end and a second end; and
the thrust bearing outer race is coupled between the actuator assembly housing and the actuation member first end.

14. The actuator assembly of claim 10, wherein the ballnut further includes a first end and a second end, and wherein the actuator assembly further comprises:
a rod end assembly coupled to the translation member second end, the rod end assembly configured to couple the translation member to an aerospace component.

15. The actuator assembly of claim 14, further comprising:
an extension tube coupled between the rod end assembly and the ballnut second end.

16. An actuator assembly, comprising:
a housing;
a motor mounted on the housing and configured to supply a rotational drive force;
a ballscrew rotationally mounted within the housing and including at least an inner surface and an outer surface, the ballscrew inner surface defining a sensor cavity, the ballscrew outer surface having a plurality of ball grooves formed thereon, the ballscrew adapted to receive the rotational drive force from the motor and configured, in response thereto, to rotate;
a ballnut disposed at least partially within housing and mounted against rotation, the ballnut disposed at least partially around the ballscrew and including at least an inner surface and an outer surface, the ballnut inner surface having a plurality of ball grooves formed thereon;
a plurality of balls disposed within the ballnut ball grooves and at least selected ones of the ballscrew ball grooves, whereby rotation of the ballscrew causes translation of the ballnut to a position; and
a thrust bearing coupled to the ballscrew, the thrust bearing including:
an inner race integrally formed on a portion of the ballscrew outer surface, the inner race having an outer surface including a plurality of annular grooves formed therein,
an outer race having at least an inner surface, an outer surface, and a plurality of ball insertion openings extending between the outer race inner and outer surfaces, the outer race inner surface spaced apart from, and surrounding at least a portion of, the inner race outer surface, the outer race inner surface having a plurality of annular grooves formed therein that are collocated with two or more of the annular grooves formed in the inner race outer surface,
a plurality of balls disposed between the inner and outer races, each ball disposed within a pair of the collocated annular grooves, and
a plurality of covers, each cover disposed within one of the plurality of ball insertion openings.

* * * * *